United States Patent Office 3,365,020
Patented Jan. 23, 1968

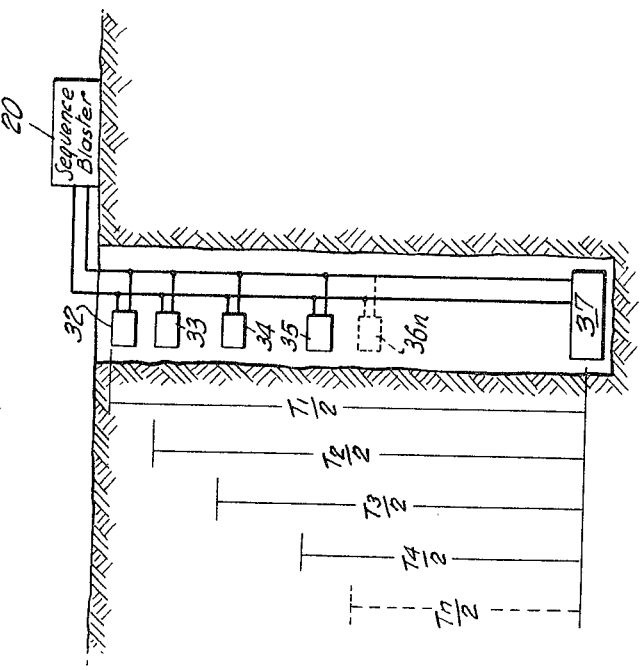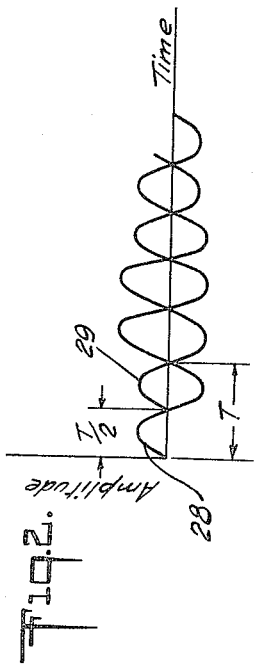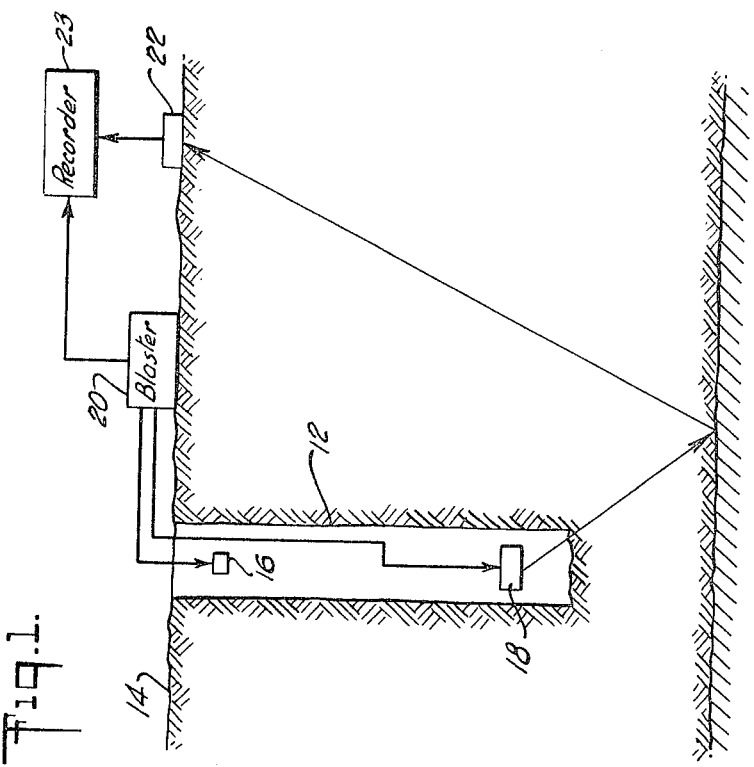

3,365,020
METHOD FOR REDUCING SEISMIC SURFACE WAVES BY SEQUENTIAL ACTIVATION OF EXPLOSIVE SOURCES
Hugh O. Walker, Jr., Houston, Tex., assignor to Texaco Inc., New York, N.Y., a corporation of Delaware
Filed Dec. 29, 1965, Ser. No. 517,391
8 Claims. (Cl. 181—.5)

ABSTRACT OF THE DISCLOSURE

The present invention relates to geophysical exploration involving improvements for eliminating or reducing the amplitude of surface waves in seismic operations wherein explosive sources of seismic waves are detonated in a borehole in the earth and seismic waves produced thereby are detected at the earth's surface a predetermined distance from the borehole, by detonating a plurality of explosive sources in a bore hole sequentially with a time separation between detonations equal to a half period of a pre-selected frequency in the surface wave, thereby reducing or eliminating the amplitude of the signals generated by the surface waves at seismic detectors responsive to the seismic waves produced by said detonations.

---

This invention relates to a method of geophysical exploration, and more particularly to a method of carrying out geophysical explorations utilizing seismic techniques wherein the amplitude of surface waves are greatly reduced.

Seismic exploration is generally carried out by detonating an explosive charge at or near the surface of the earth thereby producing seismic waves which travel out in all directions from the explosion. Detectors or geophones arranged in a predetermined array are located at a predetermined distance from the charge and respond to the seismic waves received thereby from the earth. The geophones transform these waves into corresponding electric signals which are usually recorded as traces on a seismogram. The signals of interest are those which have been reflected or refracted from an interface within the earth having different physical characteristics on either side thereof. However, it is often the case that the reflected or refracted seismic waves are obscured by unwanted waves such as surface waves which are also created by the detonation of the explosive charge.

Several ways have been utilized previously for reducing the amplitude of surface waves, for example, the geophones have been arranged in an array wherein each geophone has a spacing with respect to one another and the wavelength of the surface wave such that the surface wave signals received thereby when combined tend to cancel at least the dominant frequency thereby reducing the amplitude of the surface wave signal. Sequential shooting is another commonly known seismic technique purported to reduce surface waves. In the practice of sequential shooting, a series of charges are spaced carefully and sequentially detonated so as to achieve a single downgoing wave whose amplitude is the sum of the individual wave amplitudes. It is often assumed that the upgoing waves tend to interfere with one another, since they will not add exactly, and thereby the upgoing waves are rendered less troublesome. It should be apparent to one skilled in the art of seismic exploration, that if the sequential charges are designed to reinforce the downgoing wave, such design does not automatically result in a cancellation of the upgoing waves, nor does it necessarily reduce the amplitude of the surface wave. It will be appreciated that excessive delays between the upgoing waves can cause reinforcement of the sinusoidal-like signals.

It is an object of the present invention to provide an exact method of reducing the amplitude of surface waves generated during seismic exploration.

It is a further object of the present invention to provide a method for reinforcing the downgoing waves generated for seismic exploration while simultaneously reducing the amplitude of surface waves.

It is a further object of the invention to provide a seismogram having seismic traces in which the signals of interest are more easily distinguished.

The above objects and features of the present invention are obtained in geophysical exploration of the type which utilizes explosive charges to generate seismic waves in the earth and detector means at the earth's surface for receiving the seismic waves reflected from underlying earth strata by detonating a pair of explosive charges in a borhole sequentially with a time separation between detonations equal to a half period of a preselected frequency in the surface wave. The amplitude of the surface waves generated by the pair of explosives is consequently reduced.

The above objects and features of the present invention are also obtained by detonating explosive charges located in a borehole in a predetermined sequence with a time separation between the first and last detonation equal to a half period of a preselected frequency in the surface waves. The succeeding explosive charges are detonated a time before the detonation of the last charge equal to a half period of successive higher frequencies in the surface waves. Consequently, the amplitudes of the surface waves generated by the explosive charges are reduced.

The above mentioned and other features and objects of this invention and the manner of attaining them will become more apparent and the invention itself will be best understood, by reference to the following description of an embodiment of the invention taken in conjunction with the accompanying drawing wherein:

FIG. 1 is a schematic vertical cross section of the earth showing a shot hole and the apparatus for carrying out the method of the present invention.

FIG. 2 is a schematic representation of the wave form of a selected frequency of the surface waves generated by the first and second seismic wave sources of the seismic exploration apparatus of FIG. 1.

FIG. 3 is a schematic vertical cross section of part of the earth containing the borehole showing another embodiment for carrying out the method of the present invention.

Referring to FIG. 1, there is shown a shot hole 12 in a cross section of the earth 14 wherein is located explosive charges 16 and 18. The charges do not have to be located at any particularly set distance from one another since the theory of operation of the invention is based on the observed phenomenon that surface waves appear to originate at the epicenter, which is a point on the surface of the earth directly above the explosive charge, regardless of the depth at which the charge is placed. Accordingly, the surface waves created by seismic charge 16 should arrive at a geophone 22 at substantially the same time as any other surface waves generated by charges in the same shot hole such as seismic charge 18 regardless of the distance between charges, if the charges are simultaneously detonated. It has been substantiated experimentally that the surface waves appear to originate at the epicenter. However, there is not general agreement as to why this phenomenon occurs. In view of the "apparent" origin of the surface waves, it has been discovered that if the charges 16 and 18 are detonated sequentially either upward or downward with a time separation equal to one half the period of the dominant frequency of the surface waves, the dominant frequency of the surface waves generated thereby will be 180° out of phase thereby giving rise to cancellation and reduction of the surface wave amplitude. The period of the dominant frequency of the surface wave in the area of interest can be easily measured by detonating a charge at or near the surface and measuring a half period of the recorded surface waves resulting therefrom. The wave length of the seismic or elastic wave is dependent on the material through which it travels, and accordingly the particular period of the seismic wave may be known in general from the material of the earth or general experience in the area. Accordingly, the detonations of charges 16 and 18 are timed by blaster 20 such that the detonation of charge 18 is a predetermined half period in time after the detonation of charge 16 or vice versa. This timing is accomplished by presetting blaster 20 to separately fire each of the charges with the predetermined time separation. Any method of detonating the charges with the given time separation may be utilized. The charges could each contain a timer associated with the firing cap to detonate the charge at a predetermined time thus eliminating the need for the electrical connections to the surface.

A schematic representation of the fundamental frequency of the waveforms generated by each of the charges 16 and 18 is shown in FIG. 2. It will be appreciated that the dominant frequency of the individual waves generated have a phase relationship which is 180° out of phase with one another thus causing cancellation type interference which produces a reduction in the amplitude of the surface waves. Considering the zero time point on the abscissa as the time of the arrival of the surface wave 28, it can be seen that surface wave 29 arrives a half period later corresponding to the half wave length time separation in the sequence of firing the charges 16 and 18. All subsequent alternations of the predomiant frequency are out of phase and accordingly cancel one another.

It is known that the amplitude of the surface waves generated by a seismic shot not only depends on the size of the charge but is also dependent on the depth at which the charge is placed in the shot hole. Thus, to have optimum cancellation in the surface wave generated by the different charges, it is necessary to predetermine the size of the charge with respect to the depth at which it is placed. This can easily be determined by detonating small charges at the depths at which the actual charges are to be placed and recording the amplitude of the resulting surface waves. From the amplitude of the resulting surface waves the sizes of the charges for the particular depths can be determined. Since the charges can be placed at any depth with respect to each other insofar as this invention is concerned, one can take advantage of the sequential shooting technique and locate the deeper charge with respect to the shallow charge at a distance such that the downgoing wave will be reinforced when the firing is in a downward sequence. The proper distance in order to practice the invention and also utilize the desirable features of sequential shooting, that is, reinforce the downgoing wave, can be determined from the formula $$D = V \times T/2$$

where $D$ = distance between charges, $V$ = average velocity of the seismic wave between charges, and $T$ = the period of the surface wave as defined above. The average velocity of the seismic waves between the charges can be easily determined by utilizing a test shot and determining the time the wave generated thereby takes in travelling between the locations of the charges. It is only necessary to know the distance between the charges and the time of travel of a wave between the charges to determine the average velocity thereof.

There are many areas where the surface wave causes considerable interference with the reflected seismic signal to the extent in many cases that the desired reflected signal is completely obscured by the large amplitude surface waves.

In some areas a near surface charge is very inefficient in the generation of downgoing energy and consequently the reflected signals generated thereby have substantially insignificant amplitudes. In such an instance, the wave form produced by each detonation can be recorded separately and a composite of the records (with an appropriate time shift) at some later convenient time using conventional techniques employed on FM or digital processing machines can be provided to reduce the interference on the trace produced by the surface waves.

One of the more attractive features of the method of the invention is that the shallow charge 16 is much smaller than the larger deeper charge 18, and thus this technique adds little expense to the existing cost of shooting. Only a small charge (in some instances only a cap) is required since as mentioned previously the amplitude of surface waves from a given charge near the surface is much larger than the amplitudes generated by an equal charge at any substantial depth.

While, a single shallow charge fired sequentially with a deeper charge with a time separation of firing equal to a half cycle of the fundamental frequency of the surface wave characteristic of the area where the data is being gathered, would reduce the amplitude of the fundamental frequency of the surface wave and thereby enhance the seismogram, further improvements can be obtained by using a multiplicity of charges, each being fired a time $T_n/2$ (a half period of the $n$th frequency) preceding the firing of a predetermined charge and thereby causing a reduction of corresponding frequency components in the surface wave signal. The choice of the time $T_n/2$ would be made on the same basis as geophones in a linear array are chosen.

Referring to FIG. 3, there is shown a plurality of charges 32, 33, 34, 35 . . . 36n each of which is fired in some sequence, the only restriction being that each detonation or firing having a time separation with respect to the last fired charge which is equal to a half period of a respective preselected frequency in the surface wave. The time of firing the first and second charge would correspond to the half period of one of the frequencies of the surface wave while the next detonation would represent another selected frequency. It should be noted that the charges 32, 33, 34, 35 . . . 36n and 37 can have any selected location in the hole. Therefore, most of the charges can be located relatively close to the surface since the closer to the surface a charge is located the more efficient it is in producing surface waves. Accordingly, the near surface located charges can be small and in some cases would only have to be blasting caps. Thus a single large charge can be used to produce the reflected energy and one or more small charges used to cancel the surface wave amplitudes, produced by the large charge. The order of firing the charge is not important in the practice of this invention, although it may be desirable to fire them in a downward sequence in order to practice the sequential shooting technique at the same time. Accordingly the charges can be fired in any predetermined sequence such as an up going or down going sequence or an intermediate sequence such as the middle charge first.

The reason for the freedom in choice of the firing sequence can be appreciated when it is realized as has been emphasized previously that the location of the charges in the borehole is immaterial as far as the phase of the surface waves are concerned since the surface waves "appear" to originate at the epicenter and not the location of the charge. Thus the important factor in the phase relationship is the timing of the detonation of the charges. As long as each charge is fired with respect to another charge with a time separation equal to one-half the period of the desired frequency in the surface wave the interference cancellation will be obtained in the surface wave.

A preferred sequence would be to fire each of the charges in a downward sequence and have the charges spaced so that the downgoing wave from each detonation would reinforce to give a single strong downwardly travelling wave to produce strong reflections. Designating the distance between or separation of respective charges from a common preselected charge by $D_n$, we have the formula $D_n = V \times T_n/2$ where as previously defined $V$=average velocity of the downgoing wave between charges and $T_n$=the period of the surface wave frequency associated with the $n$th charge.

In areas where surface waves are found to be a problem their amplitude can be reduced somewhat by filtering means so that the reflections can be more readily recognized. The filters can be used to reduce the amplitude of only those frequency components contained in the surface waves which do not appear in the reflected signals. In order to reduce the amplitude of those frequency components in the surface wave which also appear in the reflected signals, the firing technique of this invention can be utilized, for example, assume the dominant frequency of the reflected signals to be 50 cycles per second. Further, let the dominant frequency of the surface waves be 50 cycles per second. According to the method of the invention, the amplitude of the surface wave can be reduced by sequentially firing two charges separated by a time interval of $T/2$ (one-half period) or in this case $10 \times 10^{-3}$ seconds. The two charges may be located in the same hole or in separate holes placed a short distance apart (10 feet for example). A preferred arrangement if it is also desired to reinforce the downgoing wave, would be to place the two charges at depths such that the time to travel the distance of separation would be equal to $10 \times 10^{-3}$ seconds which is, as previously mentioned, a half wave length of the surface wave. Continuing the example, assume the average near surface velocity in the particular area under consideration is 5000 feet per second and the optimum depth of a charge to generate reflections is 105 feet. It is desired to place the shallow charge at a distance above the deeper charge such that the downgoing wave from the shallow charge will reinforce the downgoing wave from the deeper charge. This distance and separation would be $D = V \times T/2 = 5000 \times 10 \times 10^{-3} = 50$ feet. Accordingly, the shallow charge would be placed at a depth of 55 feet which is determined by subtracting 50 from 105.

Since a shallow charge generates surface waves more efficiently than a deep charge, the shallow charge would be smaller than the deep charge. Ordinarily, the shallow charge will be less than one half the size of the deeper charge. The exact ratio will vary from one area to the next, but it can readily be determined by routine test shots using constant gain amplifiers.

Detonating the deep charge $10 \times 10^{-3}$ seconds after the detonation of the shallow charge causes the surface waves generated by the deep charge to trail the surface waves generated by the shallow charge at any detector by a time of exactly $10 \times 10^{-3}$ seconds. This results since the surface waves have an apparent point of origin at the epicenter at the instant of detonation. Since these two surface waves with respect to each other are delayed by $10 \times 10^{-3}$ seconds or one-half period of the dominant frequency of the waves, the two will tend to cancel one another and the signal generated by the surface wave at any one detector will be greatly reduced. The reflected signals will not be effected however, since the two downgoing signals are exactly in phase so as to reinforce one another.

In summary, the design criteria for reducing surface wave amplitude is based on the theoretical behavior of surface waves which has been verified experimentally in recent tests. These tests indicated that the "apparent" origin of the surface waves is located at the epicenter (surface point vertically above the charge) rather than at the depth of the charge. Making use of this characteristic of surface waves the method consists of making a seismogram with a test shot at a convenient depth and determining from the seismogram a measurement of a half-period of the surface wave generated. Subsequently two charges are spaced any distance apart vertically in a shot hole and fired sequentially with a time separation equal to the previously determined half-period. This arrangement will generate surface waves which tend to cancel the dominant frequnecy in each other. Since the above method provides freedom to place the charges at any depth, they may be spaced so that downgoing energy of the shallow charge reinforces the downgoing energy of the deeper charge. This spacing D is given by $D = V \times T/2$, where V is the average velocity between the two charges and T is the time of a period of the surface wave frequency associated with the particular charge as defined above. Any of the known methods of sequentially firing the charges may be used.

Obviously, many modifications and variations of the invention as hereinabove set forth, may be made without departing from the spirit and scope thereof, and therefore only such limitations should be imposed as are indicated in the appended claims.

I claim:

1. In geophysical exploration involving placing an explosive source in a borehole to generate seismic waves in the earth and placing detector means at the earth's surface for receiving the seismic waves reflected from underlying earth strata, the improvement comprising initiating a first seismic explosion to produce seismic energy in a bore hole and sequentially thereafter initiating a second seismic explosion to produce seismic energy in said borehole with a time separation between said first and second seismic explosions being equal to a half-period of a preselected frequency in the surface wave thereby reducing the amplitudes of the signals generated at the detectors by the surface waves from the said first and second explosive charges.

2. A method according to claim 1, wherein said first and second seismic explosions are produced sequentially downward, said explosions being spaced with respect to one another such that the downgoing seismic waves reinforce one another.

3. In geophysical exploration according to claim 1 further comprising locating the source of said first seismic explosion in a borehole at any desired depth, locating the source of said second seismic explosion in a borehole above said first source, said first and second seismic explosions being of a predetermined size in accordance with the depth selected so as to produce upon detonation surface waves of the same amplitude.

4. In a seismic geophysical prospecting according to claim 1, further comprising the steps of determining a half-period of the dominant frequency of a surface wave in the area in which seismic surveying is to be performed, and said sequential initiating of said first and second seismic explosions in a borehole comprising a shallow source of seismic explosion and a deep source of seismic explosion with a time separation of firing equal to one-half the period of the dominant frequency of the predetermined surface wave.

5. In the method according to claim 4 wherein said deep source is located in a predetermined distance from said shallow source, said distance being determined by the product of the predetermined average velocity of seismic waves in the material between the sources and the half-period time of the preselected frequency of said surface waves so that the downgoing seismic wave generated by the shallow source reinforces the downgoing seismic wave generated by the deep source.

6. In geophysical exploration involving placing explosive sources in a borehole to generate seismic waves in the earth and placing detector means at the surface for receiving the seismic waves reflected from underlying earth strata, the improvement comprising initiating seismic explosions at seismic sources located in a borehole in a predetermined sequence with a time separation between the first and last explosions equal to a half-period of the lowest preselected frequency in the surface wave, succeeding explosions being initiated a time before said last explosion equal to a half-period of successive higher frequencies in the surface waves thereby reducing the amplitudes of the resulting surface wave generated by said seismic explosions.

7. In seismic geophysical prospecting the method for reducing seismic surface waves comprising the steps of determining the half-periods of the dominant frequencies in the surface waves in the area in which seismic surveying is to be performed, initiating with a predetermined sequence a series of shallow seismic explosions and a deep seismic explosion, each shallow seismic explosion being initiated at a time with respect to said deep seismic exploson equal to a half-period of a respective one of the frequencies of the predetermined surface waves thereby producing interference and consequent attenuation of the resulting surface waves.

8. In the method according to claim 7, comprising the further step of initiating said shallow seismic explosions and deep seismic explosions in a downward sequence and locating each of said shallow seismic explosions a respective predetermined distance from said deep seismic explosion said distances being determined by the product of the predetermined average velocity of said seismic waves in the material between the seismic explosions and the times of half-periods of the preselected frequencies in the surface waves so that the downgoing seismic waves from the seismic explosions reinforce one another.

References Cited

UNITED STATES PATENTS

| 1,899,970 | 3/1933 | McCollum | 181—.5 |
| 2,706,011 | 4/1955 | Bayhi | 181—.5 |
| 2,808,894 | 10/1957 | Eisler et al. | 181—.5 |
| 2,908,342 | 10/1959 | Itria et al. | 181—.5 |
| 3,012,625 | 12/1961 | Piety | 340—15.5 X |
| 3,018,838 | 1/1962 | Hammond | 340—15.5 X |

BENJAMIN A. BORCHELT, *Primary Examiner.*

SAMUEL FEINBERG, *Examiner.*

R. M. SKOLNIK, *Assistant Examiner.*